US008909205B2

(12) United States Patent  
Davis et al.

(10) Patent No.: US 8,909,205 B2
(45) Date of Patent: Dec. 9, 2014

(54) MOBILE TELEPHONE CALL FORWARDING MANAGEMENT

(75) Inventors: Keith Lawrence Davis, Cumming, GA (US); Douglas David Gravino, Roswell, GA (US); Radhakrishnan Gopinath, Alpharetta, GA (US); Michael L. Poffenberger, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 240 days.

(21) Appl. No.: 12/870,246

(22) Filed: Aug. 27, 2010

(65) Prior Publication Data

US 2012/0052851 A1  Mar. 1, 2012

(51) Int. Cl.
*H04M 3/42* (2006.01)
*H04W 4/20* (2009.01)
*H04M 3/54* (2006.01)
*H04M 3/00* (2006.01)

(52) U.S. Cl.
CPC .......... *H04W 4/20* (2013.01); *H04M 2203/258* (2013.01); *H04M 3/54* (2013.01); *H04M 3/00* (2013.01); *H04M 2203/651* (2013.01)
USPC ........ 455/417; 455/418; 455/414.1; 455/419; 455/420

(58) Field of Classification Search
CPC ........ H04M 3/54; H04M 1/006; H04W 76/02
USPC ................ 455/417, 415, 412.2, 412.1, 550.1; 379/211.01, 212.01, 211.02
See application file for complete search history.

(56) References Cited

U.S. PATENT DOCUMENTS 6,574,470 B1 * 6/2003 Chow et al. .................. 455/417
2010/0091974 A1 * 4/2010 Kent et al. ................ 379/211.02

* cited by examiner

*Primary Examiner* — Kathy Wang-Hurst
(74) *Attorney, Agent, or Firm* — Merchant & Gould P.C.

(57) ABSTRACT

An indication of an activated call forwarding feature is provided for a mobile telephone/computing device. When a call forwarding feature is activated, an indication may be presented on the device to indicate the call forwarding feature is currently active. The indication may be visual, audible or tactile. The indication serves as a reminder to the user of the device that the call forwarding feature is active. The indication may be presented on the device continuously until the user deactivates the feature, or the indication may be presented only when incoming calls are actually forwarded. Selectable functions may be enabled on the device for changing the call forwarding activation state and for overriding call forwarding for an in-progress forwarding call.

22 Claims, 5 Drawing Sheets

MOBILE TELEPHONE CALL FORWARDING MANAGEMENT

BACKGROUND

Call forwarding is a phone feature used for directing incoming telephone calls from one telephone number to another telephone number. Call forwarding has become a ubiquitous feature on phone systems serving companies, cellular, and residential subscribers and has become a tool for both convenience and productivity. With virtually all wireless communications, a call forwarding feature can be employed when the called party wishes to forward calls to a more desired number and/or location.

In today's electronic and mobile environment, it is common for a user to utilize call forwarding as a tool of convenience and/or productivity. For example, a business person may wish to forward all calls from an office phone (landline) to a wireless phone while being away from the office for an extended period of time. An extended period of time may include traveling for business or going out for lunch. Another example may occur when a user of a wireless device wants all calls for the wireless device to be forwarded to a particular location for a period of time, for example, a place of residence, weekend retreat, or office phone. Thus, allowing the user to have all calls directed into one phone system instead of multiple phone systems. As can be appreciated by those skilled in the art, call forwarding on wireless devices is a useful tool and is often employed for some of the reasons mentioned above to mention just a few.

A problem with current call forwarding systems in mobile devices is that the user does not have a reminder that calls are forwarded from his/her mobile device to an alternate number, nor does the user have a quick reference as to the number to which calls are forwarded. A user may determine that calls directed to his/her mobile telephone should be forwarded to an alternate telephone number during a prescribed period of time, but because the user is not reminded that calls or forwarded, the user often forgets and leaves the forwarding feature activated beyond the prescribed time. Unfortunately, important calls may be missed, or the user simply may believe he/she is not receiving calls on the mobile telephone when, in fact, calls are being received, but are being forwarded.

In addition, with current call forwarding systems, the user has no method of overriding a call presently being forwarded to an alternate number. That is, if the call forwarding feature is active, the user cannot intercept a call as it is being forwarded to take the call at his/her mobile telephone. For example, if the user's call forwarding feature is active, and he/she forgets to deactivate the feature, the user may not remember calls are being forwarded, and even if the user remembers calls are being forwarded, he/she will not be able to take calls at the mobile telephone until the call forwarding feature is deactivated.

It is with respect to these and other considerations that the present invention has been made.

SUMMARY

Consistent with embodiments of the present invention, systems and methods are disclosed for allowing a user of a wireless device to receive a call forwarding indication on the wireless device serving to remind the user that all calls are currently being forwarded from the wireless device to another device number and for allowing the user to easily deactivate the call forwarding feature or to override the call forwarding feature to take a call at the wireless device while the call is being forwarded. According to embodiments, the user of a wireless device may be reminded that a call forwarding feature is active according to one or more of a variety of means. An icon may be constantly displayed on a wireless device display screen to remind the user that a call forwarding feature is active. Alternatively, the icon may only be displayed while a call is presently being forwarded to an alternate number. Similarly, an indicator light may be presented constantly during call forwarding activation or each time a call is actually forwarded. An indicator tone or tactile presentation (e.g., vibration) may be provided as calls are being forwarded to remind the user of the activated call forwarding feature. In addition, a textual presentation indicating a number to which calls are being forwarded may be provided constantly during call forwarding activation or may be provided when calls are actually forwarded.

According to other embodiments, a touch screen selectable control or icon or hardware button or key may be utilized for allowing a user to quickly toggle a call forwarding feature to an "off" mode or to an "on" mode to a preset forwarding number. In addition, during the forwarding of a call to an alternate number, the user may be allowed to intercept the call to take the call at the mobile device on a call-by-call basis without deactivating the call forwarding feature.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
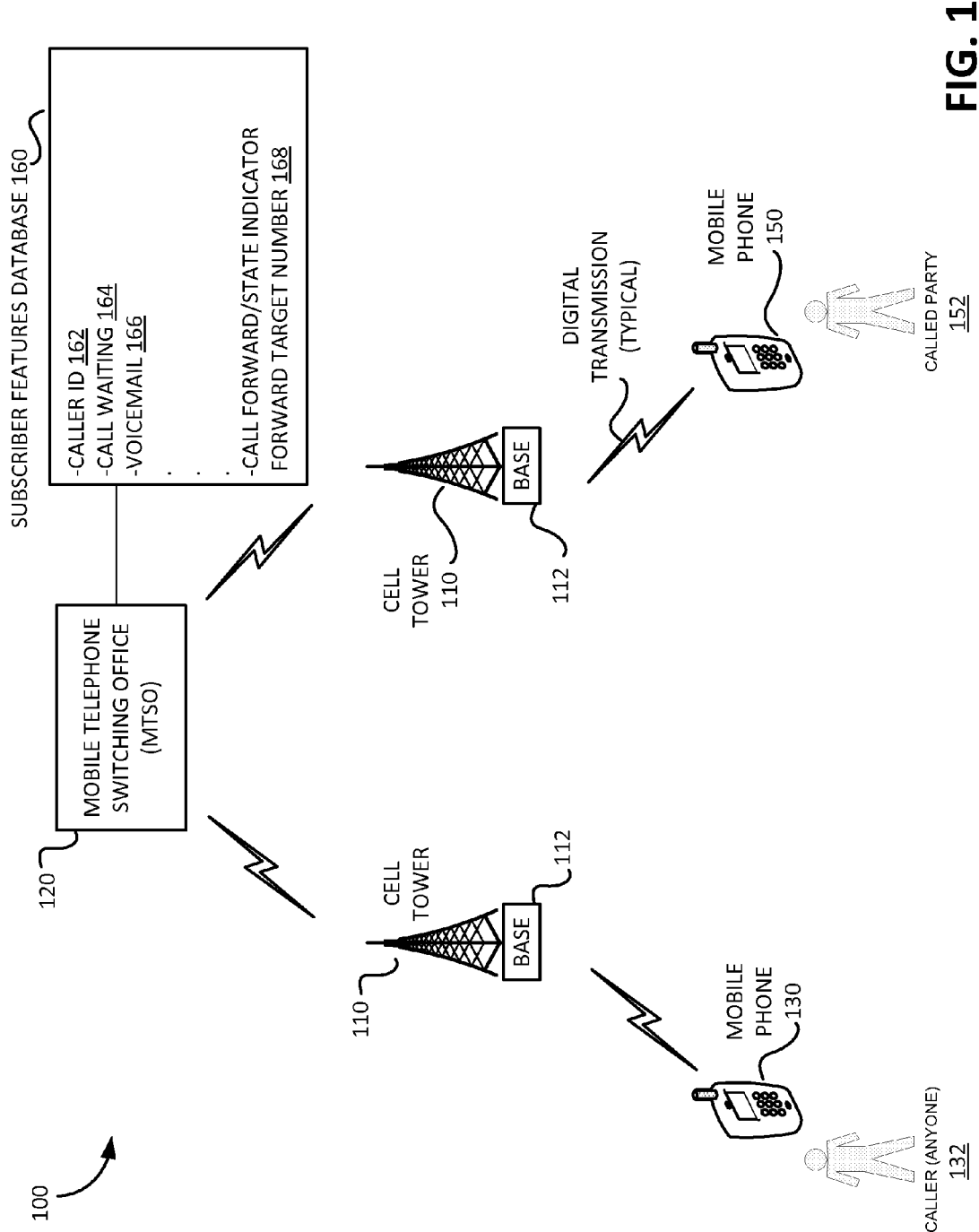
FIG. 1 is simplified block diagram illustrating a wireless communications network architecture that serves as an exemplary operating environment for the present invention.

As briefly described above, embodiments of the present invention are directed to providing an indication of an activated call forwarding feature on a mobile telephone device to allow a user of the device to quickly and readily be reminded that the call forwarding feature is active and that incoming calls are being forwarded to an alternate device number and to allow the user to change the call forwarding activation status and to intercept a call being forwarded. As will be described below, according to embodiments, a user of a wireless device may provision and activate a call forwarding feature, and during a time in which the call forwarding feature is activated, a constant reminder of the activated call forwarding feature will be presented, or a reminder will be presented each time an incoming call is forwarded.

When certain features are provisioned on a wireless device, a control center for the wireless device and the wireless device itself may provide for indication that these features are active. For example, a user of a wireless device may wish to activate call forwarding for all incoming calls to the wireless device, and have the calls forwarded to an office phone for a morning, week, etc. According to one embodiment of the invention, the wireless device control center may communicate to the wireless device that all calls are being forwarded to another number at which point the wireless device may display an indication that calls are forwarded, for example, an icon alerting the wireless device user that the call forwarding feature is active. Other methods for indicating the call forwarding feature is active include, but are not limited to, illuminating a call forwarding light, or illuminating a light of a particular color, each of which may indicate the call forwarding feature is active, changing a display screen color, presenting an audible indication, presenting a tactile (e.g., a vibration), etc. In addition, a textual presentation indicating a name, number or other identification to which calls are being forwarded may be provided constantly during call forwarding activation or may be provided when calls are actually forwarded. During a period of time in which a call forwarding feature is activated, such an indication may be presented in a constant manner, or such an indication may be presented only when an incoming call is forwarded to an alternate device.

As mentioned above, according to other embodiments, a touch screen selectable control or icon or hardware button or key may be utilized for allowing a user to quickly toggle a call forwarding feature to an "off" mode or to an "on" mode to a preset forwarding number. In addition, during the forwarding of a call to an alternate number, the user may be allowed to intercept the call to take the call at the mobile device on a call-by-call basis without deactivating the call forwarding feature.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is simplified block diagram illustrating a wireless communications network architecture that serves as an exemplary operating environment for the present invention. As should be understood, the example wireless communications network architecture illustrated in FIG. 1 is for purposes of example and is not limiting of a variety of communications configurations that may be utilized as described herein. Referring now to FIG. 1, wireless communications services are provided by various service provider companies through a wireless network 100. As is known to those skilled in the art, wireless networks may consist of but not be limited to cellular towers 110, base stations 112, and a Mobile Telephone Switching Office (hereafter referred to as "MTSO") 120.

As is known to those skilled in the art, a cellular tower 110 typically consists of a steel pole or lattice structure outfitted with antennae for transmitting and receiving signals to and from wireless devices (for example, mobile phone, personal digital assistant (PDA), smart phone, etc.), other cellular towers, and the MTSO 120. Each cellular tower 110 may have multiple sets of antenna mounted, depending upon how many different service providers use the tower 110. As should be appreciated, a variety of other cellular tower 110 configurations may be utilized. For example, antennae and associated transmitters and receivers may be mounted in other ways, such as on building tops or on mobile stations.

The base 112 of each cellular tower 110 includes sets of transmitters and receivers from each service provider having antennae mounted to the tower 110. As a unit, the cellular tower 110 and the base 112 form a system capable of transmitting, receiving, and managing data. This data may consist of, but not be limited to, voice, text, and/or electronic media. As is understood by those skilled in the art, wireless systems typically operate at various frequencies (e.g., across a frequency range from 700 megahertz (MHz) to 2100 MHz), depending upon which wireless technology is utilized. According to embodiments of the present invention, call forwarding indication may operate across this typical network of wireless systems, and therefore in the same frequency ranges.

Referring still to FIG. 1, a wireless network 100 may also employ the use of a wireless electronic communication device 130, 150 (e.g., mobile phone, personal digital assistant (PDA), smart-phone, etc.) capable of sending and receiving data in the same frequency range as the wireless communications system. The term "wireless device" will be used herein to describe a mobile wireless electronic communications device 130, 150 capable of sending and receiving electronic communications. As is understood by those skilled in the art, a wireless device 130, 150 comprises, but is not limited to, an internal circuit board, antenna, operating system software, liquid crystal display (LCD), keyboard, microphone, speaker, and a battery. All of these components and systems making up a wireless device 130, 150 work together to send, receive, and manage data within and beyond the cellular network.

Referring still to FIG. 1, an MTSO 120 serves as a central control center for the base stations 112 operating in a given area. For example, an MTSO 120 may be configured for controlling wireless communications for a wireless service provider operating in a specified city or other suitable operating area or region. In addition to other operating functions of the MTSO 120, according to embodiments of the present invention, the MTSO 120 may serve as a control point for determining, providing and controlling subscriber features. For example, in accordance with embodiments of the invention, a customer information database 160 may contain data to allow a determination as to whether a particular feature or service is provisioned for a given wireless communications device account. An example of such a feature or service may be Caller ID 162, Call Waiting 164, Voicemail 166, or Call forwarding/Indication 168. In the case of call forwarding and the embodiments described herein, the customer information database 160 may include call forwarding status information, including whether the call forwarding feature is on or off (i.e., active or not active) and the forwarding number to which calls are being forwarded. If other identifying information for the forwarding number is available, for example, name, address, etc., that information may also be maintained in the database 160 along with the forwarding number. As should be appreciated, other such identifying information may be available if the forwarding number is associated with a customer/subscriber for whom the database 160 has information, or such information may be available via contacts information from the called/forwarding party maintained on the called party's 152 wireless device 150 or maintained at a remote location accessible by the MTSO 120. Thus, if a caller 132 using a wireless mobile device 130 attempts a call to a wireless mobile device 150, a customer information database 160 may be parsed to determine which features to provision before completing the connection with a called party 152.

As briefly described above, if the called party 152 using a wireless device 150 is authorized to have call forwarding and the call forwarding indication 168, the feature may be provisioned at the MTSO 120 on the called party's wireless device. When communications are received at the MTSO 120 for routing to the called party's 152 wireless device 150, the communications may be routed in accordance with the provisioned features and may be forwarded to another wireless device, land-line telephone, and the like. When a call is received at the wireless device, requiring call forwarding, a communication will take place between the wireless device 152 and the MTSO 120 to pass the status of the call forwarding to the wireless device so that the call forwarding indication 168 will be enabled. In addition, if the called party desires to change the call forwarding status during forwarding of a call, as described below, or if the called party desires to intercept the call during forwarding, such commands from the called party at the wireless device will be passed to the MTSO 120 for processing. The communications back-and-forth between the MTSO 120 and the wireless device 150 are according to well known communications protocols between a wireless device and a wireless switching office.

While simultaneously enabling the call forwarding feature, an indication that the call forwarding provision is active may be indicated on the wireless device 150. Examples of such indications include, but are not limited to, a call forwarding icon displayed on the user interface, an illuminated light, white or of color, or a change in color of the user interface screen, indicating active. Other methods for indicating the call forwarding feature is active include, but are not limited to, presenting a number to which calls are being forwarded, presenting an audible indication, presenting a tactile (e.g., a vibration), etc. As described, when the call-forward feature is provisioned, a visual, audible or tactile indication may be presented by the wireless device 150 as a reminder that the call-forward feature remains active until the user of the wireless device deactivates the feature. Alternatively, to reduce device user interface clutter, an indication of an activated call forwarding feature may only be presented when an incoming call is actually forwarded.

Figure 2:
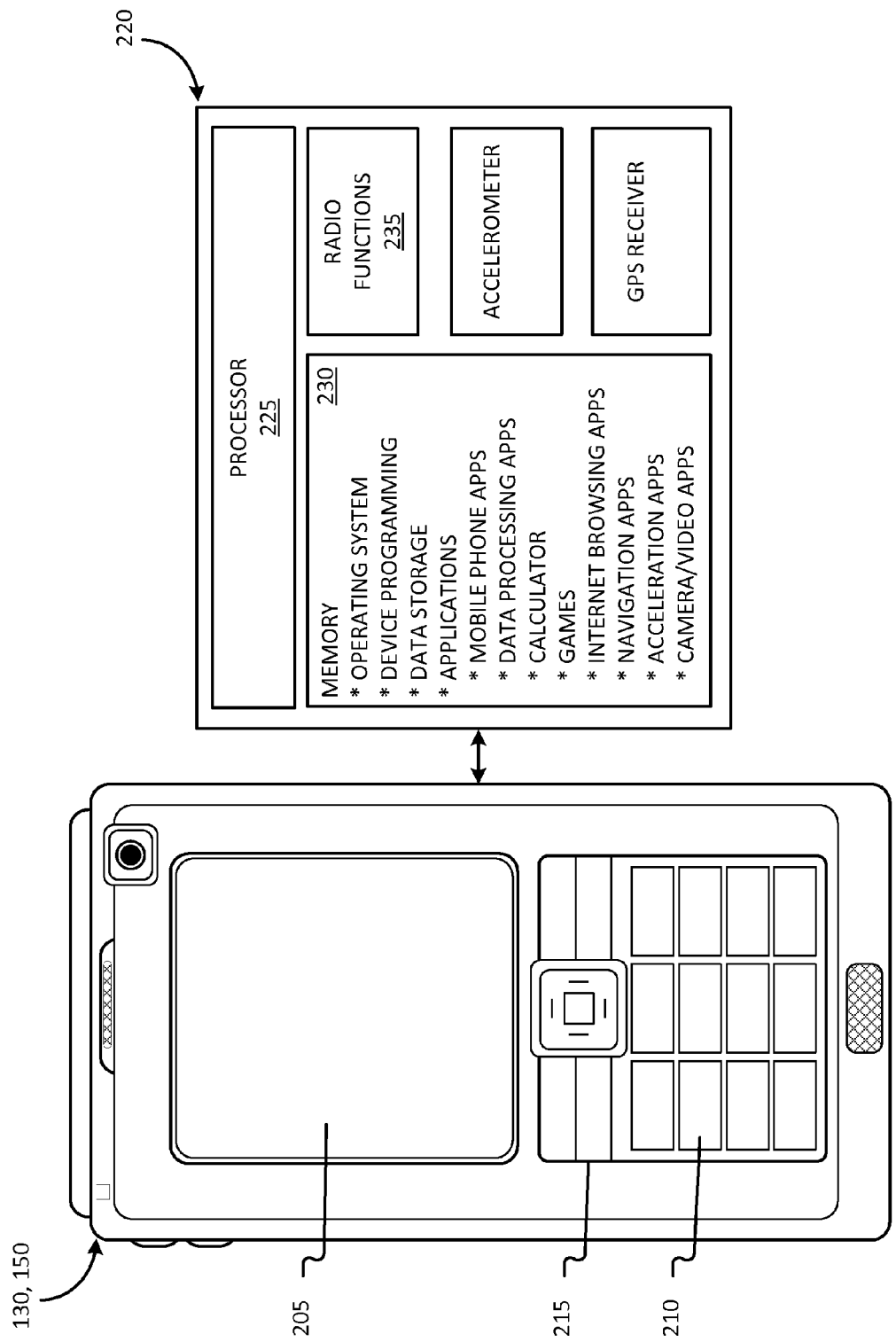
FIG. 2 is a simplified block diagram illustrating a mobile telephone/computing device with which embodiments of the present invention may be practiced.

Referring now to FIG. 2, a block diagram of a mobile telephone/computing device 130, 150 with which embodiments for which the present invention may be practiced is illustrated. The mobile computing device 130, 150 is illustrative of any suitable device, such as a mobile telephone, personal digital assistant (PDA), or handheld computer, operative to send, receive and process wireless communications according to embodiments of the present invention. A display screen 205 is operative for displaying a variety of information such as information about incoming and outgoing communications, as well as, a variety of data and displayable objects, for example, text, alphanumeric data, photographs, and the like.

Data input to the device 130, 150 may be performed via a variety of suitable means, such as, a touch screen input via the display screen 205, keyboard or keypad input via a data entry area 210, key input via one or more selectable buttons or controls 215, voice input via a microphone disposed on the device 130, 150, photographic input via a camera functionality associated with the mobile computing device 130, 150, or any other suitable input means. Data may be output via the device 130, 150 via any suitable output means, including but not limited to, display on the display screen 205, audible output via an associated speaker or connected earphone system, tactile output via a vibration module, and the like.

Operational unit 220 is illustrative of internal operating functionality of the mobile computing device 130, 150. A processor 225 is illustrative of a general-purpose computer processor for processing incoming and outgoing data and communications and controlling operation of the device and associated software applications via a mobile computing device operating system. Memory 230 may be utilized for storing a device operating system, device programming, one or more stored applications, for example, mobile telephone applications, data processing applications, calculators, games, Internet browsing applications, navigation applications, etc. Radio functions 235 include all required functionality, including onboard antennae, for allowing the device 130, 150 to communicate with other communication devices and systems via a wireless network 100.

Figure 3:
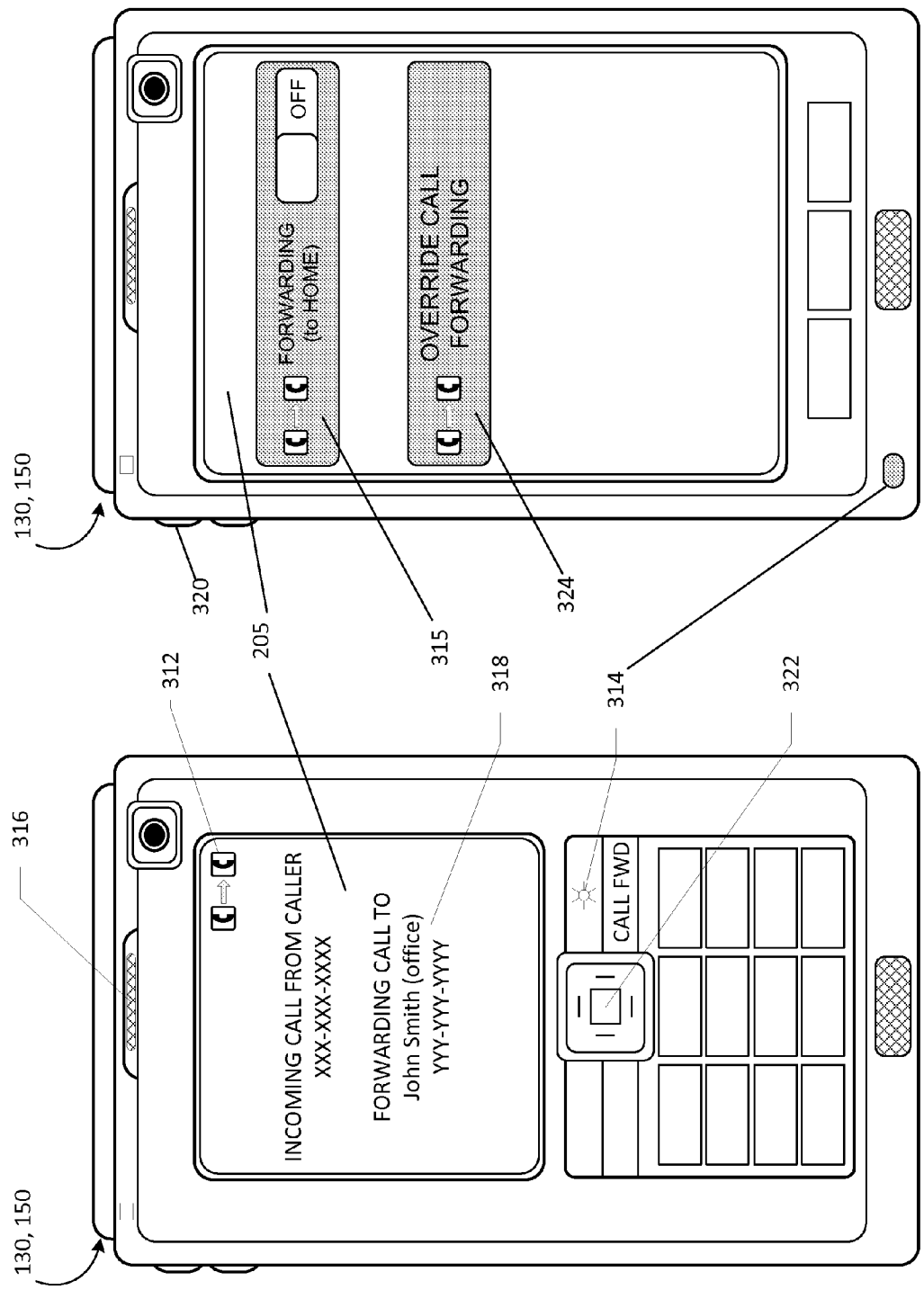
FIG. 3 is a simplified block diagram illustrating a mobile telephone/computing device interface with which embodiments of the invention may be practiced.
Figure 4:
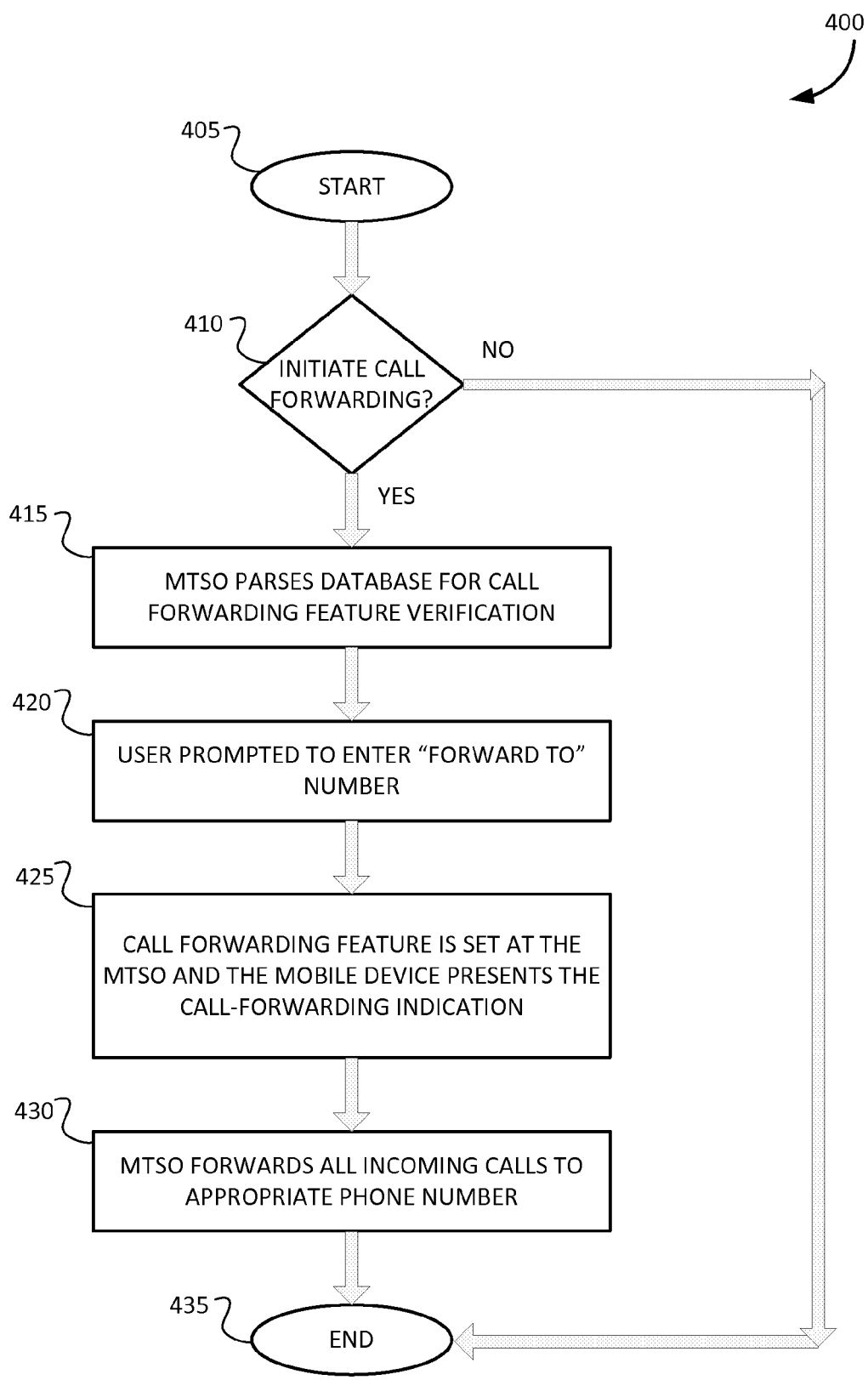
FIG. 4 is a flow diagram showing an illustrative routine for providing an indication of an activated call forwarding feature.

Having described elements of a system architecture for a mobile telephone/computing device 130, 150 that may serve as an exemplary operating environment for embodiments of the present invention, FIG. 3 is a simplified block diagram illustrating a mobile telephone device user interface with which embodiments of the present invention may be practiced. According to embodiments of the present invention, the wireless device user interface 205 of the device 130, 150 may be displayed as an LCD touch-screen with pre-programmed pushbuttons or an LCD screen, which is not a touch-screen, but which may be activated using a device keypad, each of which may be utilized to provide a call forwarding indication on the wireless device 130, 150.

As previously described, the wireless device 130, 150 may include a general message display screen 205. For example, the display screen 205 may display an incoming identification from a caller 132 intended for a called party 152. An identification may be a telephone number, a person's name, a company name, and the like.

According to embodiments of the present invention, one or more indication options may be provided for alerting the user of the wireless device that the call forwarding feature is active. Referring to the device 130, 150, icon indication 312 may be displayed for notifying the user of the wireless device that call forwarding is active. Indication 314, a light indication, may be illuminated to indicate call forwarding is active. The light indication 314 may be presented according to a variety of colors. Indication 316, an audible indication, may be yet another way to alert the user of the wireless device 130, 150 that call forwarding is active. The audible indication 316 may be in the form of a beep, tone or other audible sound to alert a user that incoming calls are forwarded. For example, during times in which call forwarding is activated, a simple beep may be presented periodically, for example, every 10 minutes. In addition, a tactile indication, for example, a vibration, may be presented from time to time while the call forwarding feature is activated to remind a user of the activated feature. A text presentation 318 may be presented to indicate a name, number or other identifying information for a party to whom calls are being forwarded. As should be appreciated, the call forwarding indication disposition options illustrated in FIG. 3 are for purposes of example and are not limiting of other options that may be available according to embodiments of the invention.

As mentioned above, the indication of the activated call forwarding feature may be presented continuously during times in which the call forwarding feature is activated, or the indication may only be presented when calls are actually forwarded. For example, during a time in which the call forwarding feature is activated, the indication 312, 314, 316 or a text indication 318 of where calls are being forwarded may be presented continuously while the call forwarding feature is active. Alternatively, the indication of the activated call forwarding feature may only be presented when calls are actually forwarded. For example, each time a call is forwarded, the indication 312, 314, 316, or a text message 318 may be presented. Or, each time a call is forwarded, an audible beep or tone or a tactile indication (e.g., a vibration) may be presented. Presentation of the call forwarding indication only when calls are actually forwarded may be advantageous to reduce sensory clutter that may be caused by a continuously presented icon, illuminated light or text message.

Referring still to FIG. 3, a selectable icon 315 may be presented when call forwarding is active to allow a user to quickly deactivate the call forwarding feature or to allow the user to quickly change the call forwarding feature from a first activation state to a second activation state. In addition to the selectable icon 315, a hardware button or key, for example, the button 320, 322 or the like, may be operatively associated with the call forwarding feature when the feature is active to allow the user to quickly change the call forwarding feature status. For example, using the touch screen selectable icon 315 or button or key 320, 322, a user may be able to turn off the call forwarding feature or to change the call forwarding feature to redirect calls to a preset destination, such as home. Rather than requiring the user to open a call processing menu to make changes to the call forwarding feature set-up, the user may quickly and easily toggle the call forwarding feature to a different status. For example, if the user is at his/her office and has calls forwarded from his/her wireless telephone to an office phone, the selectable icon 315 or button or key 320, 322 may allow the user to quickly deactivate the call forwarding feature on the fly. In the case of a preset alternate call forwarding number, for example, the user's home, the call forwarding feature may be programmed to allow selection of the icon 315 or button or key 320, 322 to keep call forwarding active, but to change call forwarding to a preset alternate number such as the user's home number.

According to another embodiment, a touch screen selectable icon 324 or hardware button or key 320, 322 may be provided for allowing a called party 152 to intercept a call while call forwarding is taking place. For example, when a call is being forwarded, the icon 324 may be presented. If the device 130, 150 employs touch screen functionality, selection of the icon 324 may cause signals from the wireless device to the MTSO 120, as described below, to allow the user/called party 152 to intercept the call at the wireless device without deactivating the call forwarding feature. Alternatively, selection of the icon 324 may allow for call interception and deactivation of the call forwarding feature simultaneously. If the wireless device 130, 150 is not equipped for touch screen functionality, a hardware button or key 320, 322 may be selected during call forwarding to intercept the call at the wireless device 130, 150.

Having described an exemplary operating environment and example call forwarding feature indications with respect to FIGS. 1-3, FIG. 4 is a flow diagram showing an illustrative routine 400 for indicating an active call forwarding feature to a user of a mobile telephone device. The routine 400 begins at start operation 405 and proceeds to operation 410 where a user of a mobile telephone/computing device 150 has the option to activate a call forwarding feature. If the user does not activate the call forwarding feature, the routine ends at operation 435.

If the user activates the call forwarding feature at operation 410, then at operation 415, the MTSO 120 parses the provisioned feature database for verification that the call forwarding feature is a subscribed service. At operation 420, the user of the wireless device 150 enters the forwarding phone number using the wireless device user interface 205. This number is communicated to the MTSO 120.

At operation 425, the MTSO 120 communicates to the mobile telephone/computing device 150 that the call forwarding feature is now active. According to one embodiment, upon communication to the wireless telephone/computing device 150 that the call forwarding feature is active, one or more of the activated call forwarding feature indications 312, 314, 316, 318 or tactile indication, described above are presented continuously during a time in which the call forwarding feature is active. That is, the presented indication remains until the feature is deactivated by the user 152 of the mobile telephone/computing device 150. Alternatively, the activated call forwarding feature indication is presented on a call-by-call basis only when incoming calls are actually forwarded. According to this embodiment, each time the MTSO 120 directs a call for the device 150 to a forwarding number, the MTSO parses the subscriber features database 160 to determine that the call forwarding feature indication 168 is required and signals the device 150 to provide the activated call forwarding feature indication to alert the user that an incoming call has been received and has been forwarded.

At operation 430, the MTSO 120 forwards all incoming calls intended for the wireless device to the specified forwarding number, and the activated call forwarding feature indication is presented. The routine ends at operation 435.

Figure 5:
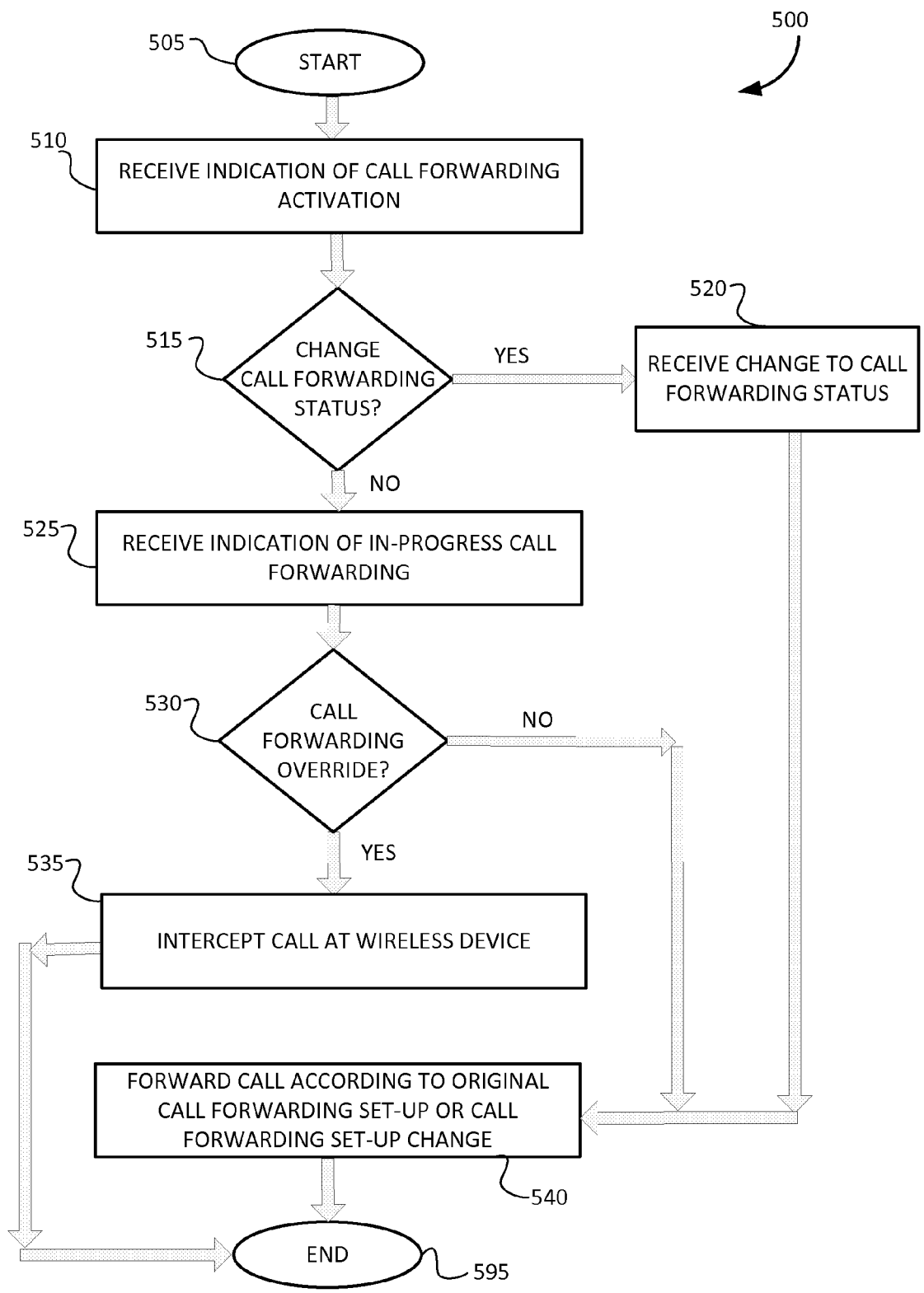
FIG. 5 is a flow diagram showing an illustrative routine for allowing on-the-fly call forwarding feature status change and for allowing interception of a forwarding call.

FIG. 5 is a flow diagram showing an illustrative routine 500 for allowing on-the-fly call forwarding feature status change and for allowing interception of a forwarding call. The routine 500 begins at start operation 505 and proceeds to operation 510 where the user receives an indication of call forwarding activation by one of the means described above with reference to operation 425, FIG. 4.

At operation 515, a determination is made as to whether the user desires to change the status of the call forwarding feature activation. If the user/called party 152 desires to change the status of the call forwarding feature activation, the user may select the touch screen selectable icon 315 or the hardware button or key 320, 322 to toggle the call forwarding feature to an off status such that incoming calls will now be received at the wireless device. Alternatively, if the call forwarding feature has been set up to associate the icon 315 or button or key 320, 322 with an alternate forwarding number, for example, the user's home number, then selection of one of these icons, buttons or keys may cause incoming calls to be forwarded to the alternate forwarding number. The routine then proceeds to operation 540, and subsequent calls are forwarded according to the forwarding set-up change. As should be appreciated, if the call forwarding feature is turned off at operation 515, then subsequent calls are received at the wireless device.

At operation 525, an indication of in-progress call forwarding is presented via a visual, audible or tactile presentation 312, 314, 316, and 318 as described herein. At operation 530, a determination is made as to whether the call forwarding operation should be overridden so that the forwarded call may be received at the wireless device 150 instead of at the forwarding number. If no call forwarding override is received, the routine proceeds to operation 540, and the call is forwarded according to the original or revised call forwarding set-up. If a call forwarding override command is received, then the routine proceeds to operation 535, and the incoming call is intercepted at the wireless device.

As described above, the call forwarding override command may be issued by the user by selecting an override icon, button or key 324, 320, 322 to initiate an override of the call forwarding operation and to have the call directed to the wireless device. According to one embodiment, all "call forwarding" calls may be treated as "simultaneous ring" calls where the call forwarding target device (i.e., the device to which calls are being forwarded) AND the wireless device 130, 150 from which calls are being forwarded may both ring simultaneously upon receipt of an incoming call. If the called party 152 selects the call forwarding override function, the call would be treated as a normal call answer at the wireless device 150. According to embodiments, the MTSO 120 may send a signal to the wireless device indicating that the incoming call is actually a call forward call so that a different call treatment is provided at the wireless device 150. For example, the MTSO 120 may direct that no actual ring tone or indication be provided at the wireless device, but that an indication of an in progress call forwarding be provided along with enablement of the override icon, button or key 324, 320, 322 to allow call forwarding override.

According to another embodiment, the MTSO 120 may forward the call to the target device number, but the MTSO may retain session control of the forwarded call. At the same time, the MTSO 120 may cause an indication on the wireless call that a call is being forwarded as describe herein. If the user/called party 152 overrides the call forwarding operation, the MTSO 120 may interrupt the ringing of the call forwarding target device and may divert the ring back to the wireless device 150. The routine ends at operation 595.

Although described in combination with a mobile telephone/computing device 130, 150 and a MTSO 120, in alternative embodiments, the invention may be used in combination with any number of computer systems, such as in desktop environments, laptop or notebook computer systems, multi-processor systems, micro-processor based or programmable consumer electronics, network PCs, mini computers, main frame computers and the like. Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory 230 and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of indicating an active call forwarding feature on a mobile telephone/computing device, comprising:
   initiating a call forwarding feature on a mobile telephone/computing device for forwarding calls directed to the mobile telephone/computing device to an alternate telephone number;
   indicating on the mobile telephone/computing device an incoming call;
   in response to initiating the call forwarding feature, continuously indicating on the mobile telephone/computing device a reminder that incoming calls directed to the mobile telephone/computing device are forwarded to an alternate telephone number wherein the reminder remains active until the call forwarding indication feature is deactivated; and
   in response to indicating on the mobile telephone/computing device an incoming call, indicating on the mobile telephone/computing device a call forwarding override command to initiate an override of the call forwarding feature during the incoming call and to have the incoming call directed to the mobile telephone/computing device.

2. The method of claim 1, wherein indicating on the mobile telephone/computing device that incoming calls directed to the mobile telephone/computing device are forwarded to an alternate telephone number includes presenting a visual icon on the mobile telephone/computing device.

3. The method of claim 1, wherein indicating on the mobile telephone/computing device that incoming calls directed to the mobile telephone/computing device are forwarded to an alternate telephone number includes presenting a text message on the mobile telephone/computing device.

4. The method of claim 3, wherein presenting a text message on the mobile telephone/computing device includes presenting information identifying a call forwarding party to whom incoming calls are being forwarded.

5. The method of claim 3, wherein presenting information identifying a call forwarding party to whom incoming calls are being forwarded includes presenting one or more of a name, telephone number or address of the call forwarding party to whom incoming calls are being directed.

6. The method of claim 1, wherein indicating on the mobile telephone/computing device that incoming calls directed to the mobile telephone/computing device are forwarded to an alternate telephone number includes presenting an illuminated light on the mobile telephone/computing device.

7. The method of claim 1, wherein indicating on the mobile telephone/computing device that incoming calls directed to the mobile telephone/computing device are forwarded to an alternate telephone number includes presenting an audible output on the mobile telephone/computing device.

8. The method of claim 1, wherein indicating on the mobile telephone/computing device that incoming calls directed to the mobile telephone/computing device are forwarded to an alternate telephone number includes presenting a tactile output on the mobile telephone/computing device.

9. The method of claim 1, wherein after receiving an initiation of a call forwarding feature on a mobile telephone/ computing device for forwarding calls directed to the mobile telephone/computing device to an alternate telephone number, further comprising updating a subscriber features database associated with the mobile telephone/computing device to indicate that calls directed to the mobile telephone/computing device are forwarded to the alternate telephone number.

10. The method of claim 9, wherein after receiving an initiation of a call forwarding indication feature on the mobile telephone/computing device, further comprising updating a subscriber features database associated with the mobile telephone/computing device to indicate that an indication of an activated call forwarding feature will be provided on the mobile telephone/computing device for forwarded calls.

11. The method of claim 1, wherein indicating on the mobile telephone/computing device that incoming calls directed to the mobile telephone/computing device are forwarded to an alternate telephone number until the call forwarding indication feature is deactivated includes indicating continuously that incoming calls are forwarded until the call forwarding indication feature is deactivated.

12. The method of claim 1, wherein indicating on the mobile telephone/computing device that incoming calls directed to the mobile telephone/computing device are forwarded to an alternate telephone number until the call forwarding indication feature is deactivated includes indicating that incoming calls are forwarded on a call-by-call basis until the call forwarding indication feature is deactivated.

13. The method of claim 1, after receiving an initiation of a call forwarding indication feature on the mobile telephone/computing device,
receiving a call directed to the mobile telephone/computing device;
parsing a subscriber features database to determine whether an indication of an activated call forwarding feature is to be presented on the mobile telephone/computing device; and
if an indication of an activated call forwarding feature is to be presented on the mobile telephone/computing device, presenting the indication of an activated call forwarding feature on the mobile telephone/computing device.

14. The method of claim 13, further comprising enabling a selectable call forwarding override function on the mobile telephone/computing device for receiving an override of the activated call forwarding feature, and upon receiving a selection of the selectable call forwarding override function, causing the received call directed to the mobile telephone/computing device to be received at the mobile telephone/computing device.

15. The method of claim 14, wherein enabling a selectable call forwarding override function on the mobile telephone/computing device for receiving an override of the activated call forwarding feature includes displaying a touch screen selectable icon on the mobile telephone/computing device for selectively overriding the activated call forwarding feature on a call-by-call basis.

16. The method of claim 1, further comprising enabling a selectable call forwarding feature toggle function on the mobile telephone/computing device for receiving a call forwarding feature activation change, and upon receiving a selection of the selectable call forwarding feature toggle function, causing the call forwarding feature on the mobile telephone/computing device to change from a first activation state to a second activation state.

17. The method of claim 16, wherein enabling a selectable call forwarding feature toggle function on the mobile telephone/computing device for receiving a call forwarding feature activation change includes displaying a touch screen selectable icon on the mobile telephone/computing device for selectively causing the call forwarding feature on the mobile telephone/computing device to change from a first activation state to a second activation state.

18. The method of claim 17, wherein enabling a selectable call forwarding feature toggle function on the mobile telephone/computing device for receiving a call forwarding feature activation change includes enabling a selectable call forwarding feature toggle function which when selected causes the call forwarding feature to be activated for forwarding subsequent incoming calls to a second alternate telephone number.

19. A method of indicating an active call forwarding feature on a mobile telephone/computing device, comprising:
initiating a call forwarding feature on a mobile telephone/computing device for forwarding calls directed to the mobile telephone/computing device to an alternate telephone number;
updating a subscriber features database associated with the mobile telephone/computing device to indicate that calls directed to the mobile telephone/computing device are forwarded to the alternate telephone number;
updating a subscriber features database associated with the mobile telephone/computing device to indicate that an indication of an activated call forwarding feature will be provided on the mobile telephone/computing device for forwarded calls;
receiving an incoming call on the mobile telephone/computing device;
in response to initiating a call forwarding feature, continuously displaying a selectable button indicating a reminder on the mobile telephone/computing device that incoming calls directed to the mobile telephone/computing device are forwarded to an alternate telephone number wherein the reminder remains active until the call forwarding indication feature is deactivated or overridden; and
in response to receiving the incoming call, displaying a selectable button indicating on the mobile telephone/computing device a call forwarding override command to initiate an override of the call forwarding feature, wherein the selectable button is selectable to override the call forwarding feature on the mobile telephone/computing device during the incoming call to have the incoming call directed to the mobile telephone/computing device.

20. The method of claim 19, wherein indicating on the mobile telephone/computing device that incoming calls directed to the mobile telephone/computing device are forwarded to an alternate telephone number includes presenting on the mobile telephone/computing device one of a visual icon, a text message, an illuminated light, an audible output, or a tactile output.

21. A system for indicating an active call forwarding feature on a mobile telephone/computing device, comprising:
a mobile telephone switching office operative
to receive an initiation of a call forwarding feature on a mobile telephone/computing device for forwarding calls directed to the mobile telephone/computing device to an alternate telephone number;
to receive a call directed to the mobile telephone/computing device;
to determine the call directed to the mobile telephone/computing device is to be forwarded to the alternate telephone number; and in response to initiation of a call forwarding feature, to cause the mobile telephone/computing device to display a selectable button to continuously indicate a reminder that the call directed to the mobile telephone/computing device will be forwarded to an alternate telephone number wherein the reminder remains active until the call forwarding indication feature is deactivated or overridden; and in response to receiving a call directed to the mobile telephone/computing device, displaying a selectable button indicating on the mobile telephone/computing device a call forwarding override command to initiate an override of the call forwarding feature during the incoming call, wherein the selectable button is selectable to override the call forwarding feature on the mobile telephone/computing device to have the incoming call directed to the mobile telephone/computing device.

22. The system of claim 21, wherein the mobile telephone switching office is further operative to cause the mobile telephone/computing device to indicate that the call directed to the mobile telephone/computing device is forwarded to an alternate telephone number by causing the mobile telephone/computing device to present on the mobile telephone/computing device one of a visual icon, a text message, an illuminated light, an audible output, or a tactile output.

* * * * *